United States Patent
Gururaja et al.

(10) Patent No.: US 11,861,583 B2
(45) Date of Patent: Jan. 2, 2024

(54) SYSTEMS AND METHODS OF DETECTING SCAN AVOIDANCE EVENTS

(71) Applicant: ZEBRA TECHNOLOGIES CORPORATION, Lincolnshire, IL (US)

(72) Inventors: Abhilash Gururaja, Levittown, NY (US); Christopher J. Fjellstad, Smithtown, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 378 days.

(21) Appl. No.: 16/861,038

(22) Filed: Apr. 28, 2020

(65) Prior Publication Data

US 2021/0334780 A1    Oct. 28, 2021

(51) Int. Cl.
  *G06Q 20/20* (2012.01)
  *G06Q 30/018* (2023.01)
  *G08B 13/02* (2006.01)
  *G06K 7/10* (2006.01)
  *G06K 7/14* (2006.01)

(52) U.S. Cl.
  CPC ....... *G06Q 20/208* (2013.01); *G06K 7/10554* (2013.01); *G06K 7/1413* (2013.01); *G06K 7/1417* (2013.01); *G06Q 30/0185* (2013.01); *G08B 13/02* (2013.01)

(58) Field of Classification Search
  CPC ............. G06Q 20/208; G06Q 30/0185; G06K 7/10554; G06K 7/1413; G06K 7/1417; G08B 13/02
  USPC .......................................................... 705/23
  See application file for complete search history.

(56) References Cited

U.S. PATENT DOCUMENTS

| | | | |
|---|---|---|---|
| 5,747,784 A | 5/1998 | Walter et al. | |
| 9,892,438 B1* | 2/2018 | Kundu | G06Q 30/0609 |
| 2003/0052170 A1* | 3/2003 | Ohkawa | G06K 7/10574 |
| | | | 235/454 |
| 2009/0060259 A1* | 3/2009 | Goncalves | A47F 9/047 |
| | | | 382/100 |
| 2014/0278789 A1* | 9/2014 | Singh | G06Q 30/0203 |
| | | | 705/7.32 |

OTHER PUBLICATIONS

Examination Report for the Australian Patent Application No. 2021201856 dated Nov. 29, 2021.

* cited by examiner

*Primary Examiner* — Florian M Zeender
*Assistant Examiner* — Joseph M Mutschler

(57) ABSTRACT

Methods of detecting scan avoidance events during decode sessions are disclosed herein. An example method includes during a timeout period at one or more processors of the symbology scanner, identifying and decoding a transaction affecting indicia on an object in one or more images to obtain a transaction affecting payload; during the timeout period at the one or more processors, identifying one or more visual features in the one or more images; and in response to identifying a non-transaction affecting indicia associated with the one or more visual features, and failing to identify or decode the transaction affecting indicia, determining a potential scan avoidance attempt and generating a scan avoidance alarm signal.

12 Claims, 4 Drawing Sheets

SYSTEMS AND METHODS OF DETECTING SCAN AVOIDANCE EVENTS

BACKGROUND

In a retail environment, purchasing items typically involves using a barcode reader at a point-of-sale (POS) system to capture images of barcodes attached to each item to be purchased, and decoding the images to identify each item being purchased. In some cases, retail employees scan barcodes on each item a customer wishes to purchase, while in other cases, customers scan the barcodes on items they wish to purchase at self-checkout stations.

SUMMARY

In an embodiment, a computer-implemented method for detecting a potential scan avoidance during a timeout period at one or more processors of the symbology scanner, identifying and decoding a transaction affecting indicia on an object in one or more images to obtain a transaction affecting payload; during the timeout period at the one or more processors, identifying one or more visual features in the one or more images; and in response to identifying a non-transaction affecting indicia associated with the one or more visual features, and failing to identify or decode the transaction affecting indicia, determining a potential scan avoidance attempt and generating a scan avoidance alarm signal.

In variations of the above embodiment, the method further includes in response to successfully identifying and decoding the transaction affecting indicia to obtain the transaction affecting payload, sending the transaction affecting payload to a point-of-sale system for affecting a transaction for the object.

In variations of the above embodiments, the method further comprises, in response to not identifying a non-transaction affecting indicia associated with the one or more visual features not determining a potential scan avoidance event.

In variations of the above embodiments, wherein the non-transaction affecting indicia includes a non-transaction affecting payload having information associated with a weblink.

In another embodiment, a system to detect a scan avoidance event during a decode session of a symbology reader includes: an imaging assembly configured to capture, during a timeout period, one or more images; a barcode decoder configured to, during the timeout period, determine a transaction affecting payload from a transaction affecting indicia in the one or more images, and identify a non-transaction affecting indicia in the one or more images; and a scan avoidance event detector configured to (i) in response to identifying the non-transaction affecting indicia, and failing to determine the transaction affecting payload, determine a potential scan avoidance attempt, and generating a scan avoidance alarm signal, and (ii) in response to successfully determining the transaction affecting payload, send the transaction affecting payload to a point-of-sale (POS) system to affect a transaction for the object.

Figure 1:
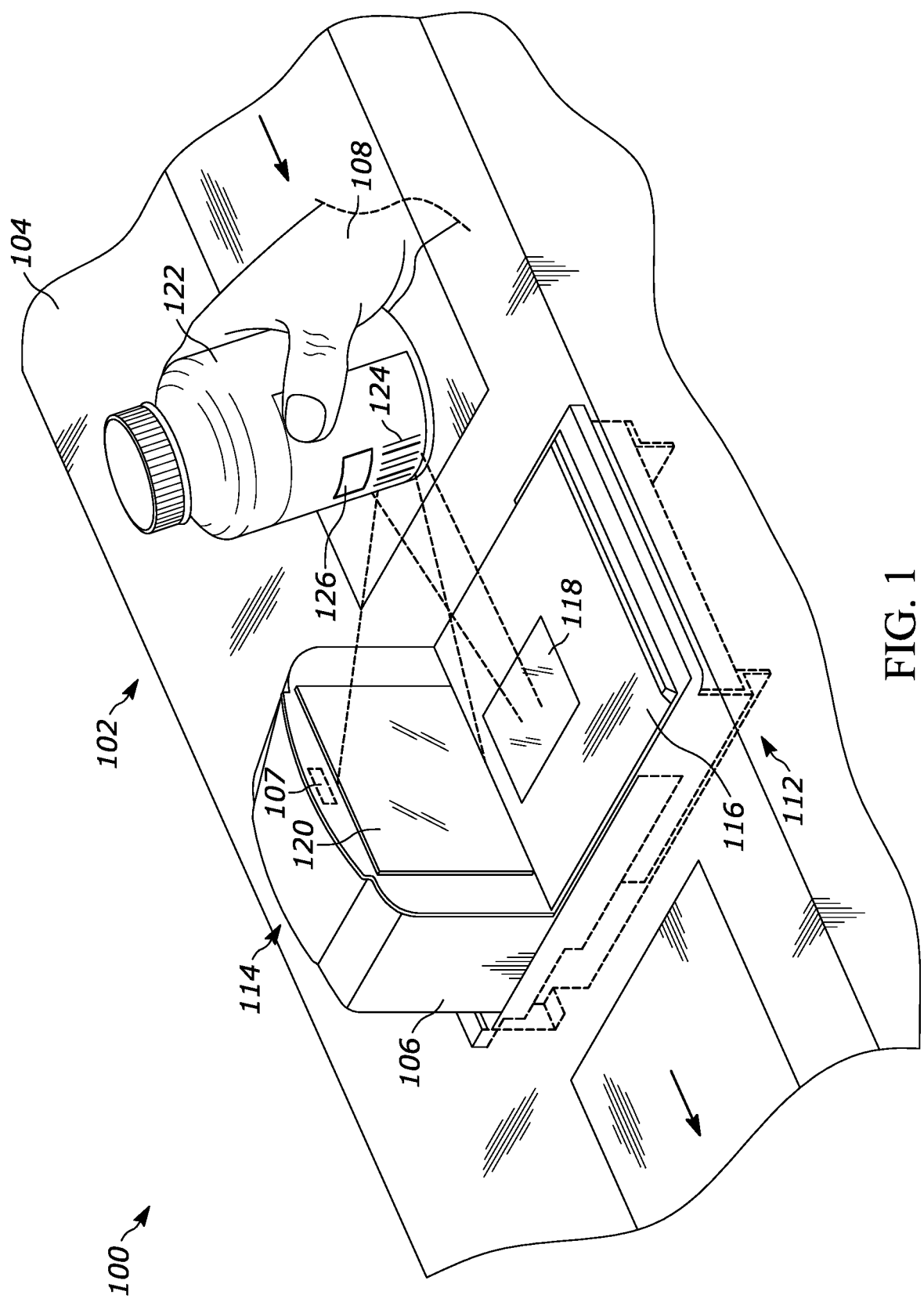
FIG. 1 illustrates a perspective view of an example POS system, in accordance with aspects of this disclosure.

In the accompanying figures, like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention. In general, the same reference numbers will be used throughout the drawing(s) and accompanying written description to refer to the same or like parts.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Skilled artisans will readily recognize from the following discussion that alternate embodiments of the structures and methods illustrated herein may be employed without departing from the principles set forth herein.

DETAILED DESCRIPTION

As a retail employee or customer scans items for purchase, "scan avoidance," which may be accidental or intentional, may occur. Scan avoidance represents loss of revenue due to theft, accident, misuse, etc. Scan avoidance event alerts can result in a manager, a security agent, a police officer, etc. becoming involved. Such situations often result in embarrassment, inconvenience, delay, etc. for a shopper. Accordingly, aspects of this disclosure can be used to confirm detection of scan avoidance events before they are alerted, thereby reducing false scan avoidance event alerts, thereby, maintaining positive customer sentiment and reducing time spent on behalf of a store. Advantageously, the examples disclosed herein achieve such benefits without the use of expensive and/or complex neural networks and/or complex image processing that are currently in use in some retail stores. Such expensive and/or complex neural networks may prevent their usage in some retail stores.

Most items being sold in a retail environment include a transaction affecting indicia representing a transaction affecting payload that represents a multi-digit identification number (e.g., a universal product code (UPC), a European article number (EAN), etc.) for an item. The transaction affecting payload is conveyed to a point-of-sale (POS) system for use identifying the item and charging a customer for the item. Increasingly, manufacturers are additionally including non-transaction affecting indicia (e.g., a quick response (QR) code, etc.) representing a non-transaction affecting payload (e.g., information associated with a weblink, etc.). In some instances, such non-transaction affecting indicia are positioned near transaction affecting indicia.

Non-transaction affecting payload are typically not intended for use in charging a customer for the item. Thus, such non-transaction affecting indicia or their associated non-transaction affecting payload need not be conveyed to a POS system. However, a non-transaction affecting payload may be used by the POS system to reference the payload from a transaction-affecting indicia. In some examples, non-transaction affecting indicia are scanned or read by a person using, for example, a smartphone, etc., distinct from a POS system.

It has been advantageously discovered that when a non-transaction affecting indicia is identified, but a transaction affecting indicia is not identified and/or not decodable, then it is likely that a scan avoidance event has occurred, and a store manager can be notified and/or an alert be presented a POS system. In addition to and/or alternative to visual features in the form non-transaction affecting indicia, any number and/or type(s) of other non-transaction affecting visual features may be used to confirm potential scan avoidance events. Example additional on-transaction affecting visual features include, but are not limited to a non-transaction affecting indicia, a barcode, a QR code, text, a graphic, a logo, a background, an outline, a dimension, a physical feature, a human body part, etc. Thus, in general, when any type of non-transaction affecting visual feature is identified during a timeout period, but a transaction affecting indicia is not identified and/or not decodable during the same timeout period, then it is likely that a scan avoidance event has occurred, and a store manager can be notified and/or an alert presented a POS system. Additionally, when a visual feature, such a human body part, is not normally going to include an indicia, then it can be ignored and a scan avoidance event not alerted. An example timeout period represents a time period (e.g., five hundred milliseconds) during which, it is determined whether a non-transaction affecting indicia is identified and a transaction affecting indicia is not identified and/or not decodable.

While for ease of discussion, the following disclosure refers to barcodes, aspects of this disclosure may be used to confirm scan avoidance events for any number and/or type(s) of indicia including, but not limited to, QR codes, custom codes, etc. Further, while the following disclosure refers to example barcode readers and POS systems, aspects of this disclosure may be used with any number and/or type(s) of symbology readers including bi-optical readers, bi-optic readers, etc. for use with any number and/or type(s) of scanners including, for example, stationary barcode readers, handheld barcode readers, presentation mode barcode readers, etc. Moreover, while example barcode readers are disclosed in conjunction with POS systems, aspects of this disclosure to detect scan avoidance events can be used in conjunction with storage systems, inventory systems, etc.

FIG. 1 illustrates a perspective view of an example POS system 100 having a workstation 102 with a counter 104 and a bi-optic barcode reader 106 that may be used to implement the example systems and methods disclosed herein to determine, confirm, etc. potential scan avoidance events when, during a timeout period a non-transaction affecting visual feature (e.g., a non-transaction affecting indicia, a QR code, a barcode, text, a graphic, a logo, a background, an outline, a dimension, a physical feature, a human body part, etc.), but a transaction affecting indicia is not identifiable and/or not decodable during the same timeout period. The POS system 100 is often managed, operated, etc. by a store employee such as a clerk 108. However, in other cases the POS system 100 may be a part of a so-called self-checkout lane where instead of a clerk, a customer is responsible for checking out his or her own products.

The barcode reader 106 includes a first (e.g., lower) housing 112 and a second (e.g., raised, vertical or tower) housing 114. The lower housing 112 includes a top portion 116 with a first optically transmissive window 118 positioned therein along a generally horizontal plane relative to the overall configuration and placement of the barcode reader 106. Generally speaking, the top portion 116 includes a removable or a non-removable weigh platter (e.g., an electronic scale configured to measure/register the weight of objects placed on the top portion 116). The top portion 116 is positioned substantially parallel with a top surface of the counter 104. As set forth herein, the phrase "substantially parallel" means +/−30° of parallel and/or accounts for manufacturing tolerances. While in FIG. 1, the counter 104 and the top portion 116 are illustrated as being about co-planar, the top portion 116 and the counter 104 may, additionally and/or alternatively, be considered as being about parallel. In some examples, the surface of the counter 104 is raised or lowered relative to the top portion 116, while the top portion 116 remains substantially parallel with the top surface of the counter 104. The raised housing 114 is configured to extend above the top portion 116 and includes a second optically transmissive window 120 positioned in a generally upright plane relative to the top portion 116 and/or the first optically transmissive window 118. Note that references to "upright" include, but are not limited to, vertical. Thus, as an example, something that is upright may deviate from a vertical axis/plane by as much as 30°.

In practice, a product, object, item 122, etc., such as for example a bottle, is moved, swiped, etc. past the barcode reader 106 such that a transaction affecting indicia (e.g., a barcode 124) associated with the item 122 is read (e.g., imaged and decoded) through at least one of the first optically transmissive window 118 and the second optically transmissive window 120. This is particularly done by positioning the item 122 within fields of view (FOV) of digital imaging sensor(s) (e.g., a camera 107) housed inside the barcode reader 106 behind the windows 116 and 118. Additionally, as the item 122 is moved past the barcode reader 106, the cameras obtain image data of the item 122. In some examples, the image data is to verify that the item 122 scanned matches the barcode 124. The example item 122 also includes an example non-transaction affecting visual feature in the form of a QR code 126.

Figure 2:
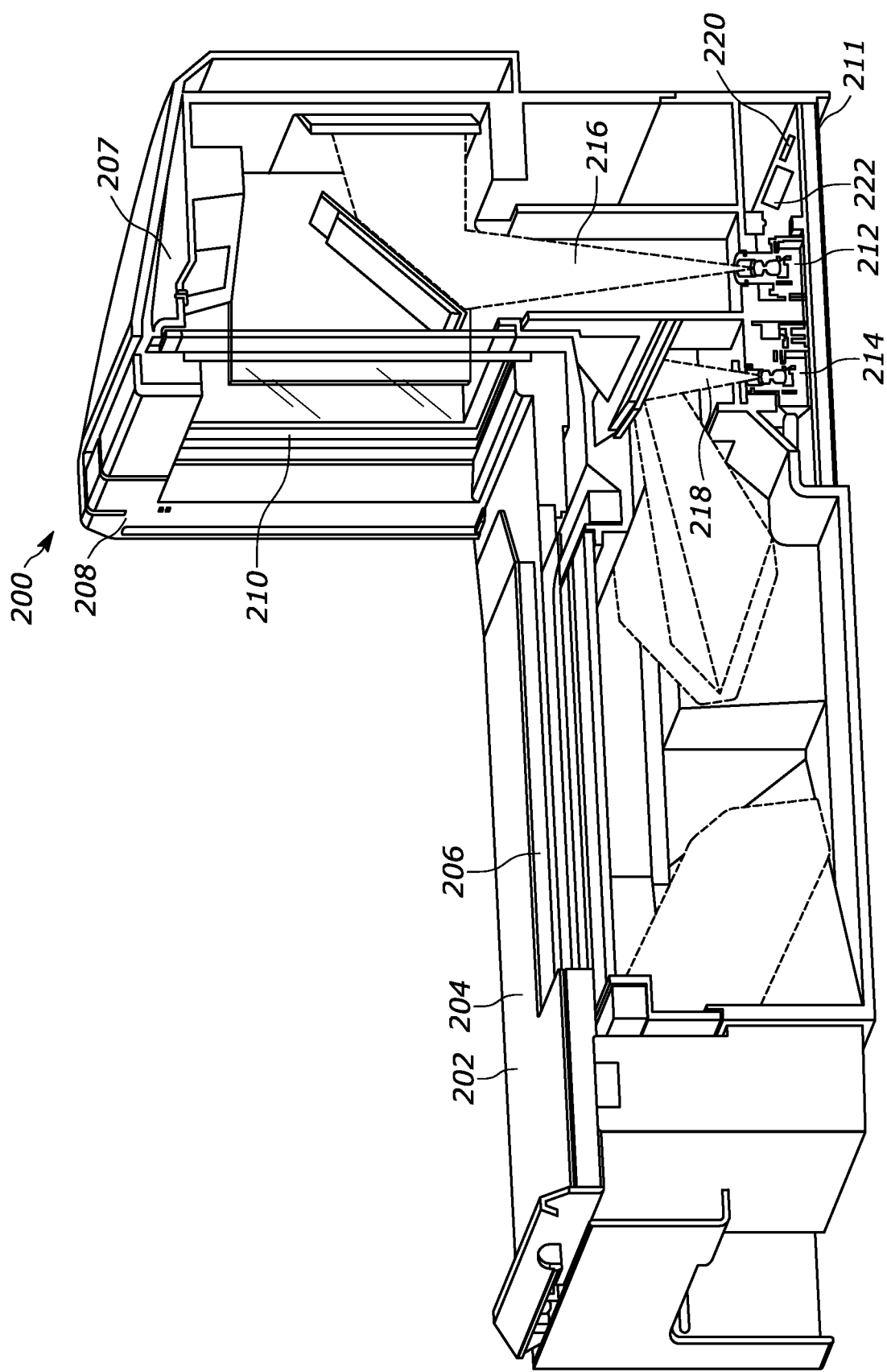
FIG. 2 illustrates a cross-sectional perspective view of an example bi-optic barcode reader including a scan avoidance event detector, in accordance with aspects of this disclosure.

FIG. 2 illustrates a cross-sectional perspective view of an example bi-optic barcode reader 200 that can be used to implement the barcode reader 106 of FIG. 1, in accordance with embodiments of this disclosure. As shown, the barcode reader 200 includes an example first (e.g., lower or platter) housing portion 202 that supports a generally horizontal weigh platter 204 having a first, generally horizontal window 206. The barcode reader 200 is also shown including an example second (e.g., raised, vertical or tower) housing portion 208 that supports a second, generally vertical optically transmissive window 210. As shown, the first window 206 is substantially perpendicular relative to the second window 210. As set forth herein, the phrase "substantially perpendicular" means +/−30° of perpendicular and/or accounts for manufacturing tolerances.

To enable imaging data to be obtained by the barcode reader 200, the barcode reader 200 includes a printed circuit board (PCB) 211 with one or more imaging assemblies 212, 214 (e.g., cameras). Each of the imaging assemblies 212, 214 includes an imaging sensor having a plurality of photosensitive elements that define a substantially flat surface along with other components such as a housing and lens(es) for capturing image data for a FOV. The arrangement and configuration of the components including the imaging sensor, the photosensitive elements, the housing, the lens(es) define a specific FOV for each of the imaging assemblies 212, 214. As shown, the first imaging assembly 212 is configured to capture image data over a first FOV 216 and the second imaging assembly 214 is configured to capture image data over a second FOV 218. The image data captured by the first and second imaging assemblies 212, 214 may include image data representative of an environment in which a barcode or target may appear. In some examples, the logic circuit 400 of FIG. 4 implements the PCB 211. In various examples, the example processes described in reference to PCB 211 and/or, more generally aspects of the PCB 211 may be achieved in hardware, in software, firmware, and/or some combination thereof.

To identify and decode indicia from images of items, the PCB 211 includes any number and/or type(s) of barcode decoder 220. To detect potential scan avoidance events, the PCB 211 includes an example scan avoidance event detector 222. The scan avoidance event detector 222 determines a potential scan avoidance event when any type of non-transaction affecting visual feature (e.g., a non-transaction affecting indicia, a QR code, a barcode, text, a graphic, a logo, a background, an outline, a dimension, a physical feature, a human body part, etc.) is identified during a timeout period, but a transaction affecting indicia is not identified and/or not decodable during the same timeout period, it is likely that a scan avoidance event has occurred. When a scan avoidance event is likely, the scan avoidance event detector 222 generates a scan avoidance alert signal, alert, notification, report, etc. In some examples, an indication of the generated alert indicating the potential scan avoidance event is presented to a user of the barcode reader 200, e.g., via a user interface of a POS system 100. Additionally and/or alternatively, an indication of the generated alert indicating the potential scan avoidance event may be sent to another (e.g., remote) computing device for presentation to an individual distinct from a user of the barcode reader 200 (e.g., a manager, owner, or other stakeholder associated with the retail environment). Further, the alert may be stored, recorded, etc. for subsequent recall. Alerts, notifications, etc. can be sent, transferred, etc. via any number and/or type(s) of communication interfaces, devices, networks, etc.

In some examples, generating the alert or notification indicating the potential scan avoidance event includes capturing an image of a user of the barcode reader 200 via another camera distinct from the barcode reader's camera(s) 212, 214. For example, the additional camera may be positioned and/or angled to capture an image of the face of a user operating the barcode reader 200. In some examples, a facial recognition algorithm may be used to analyze the image of the face of the user to identify the user associated with the potential scan avoidance event. In other examples, the image of the face of the user operating the barcode reader 200 may be sent to a computing device associated with a manager, owner, or other stakeholder associated with the retail environment.

Figure 4:
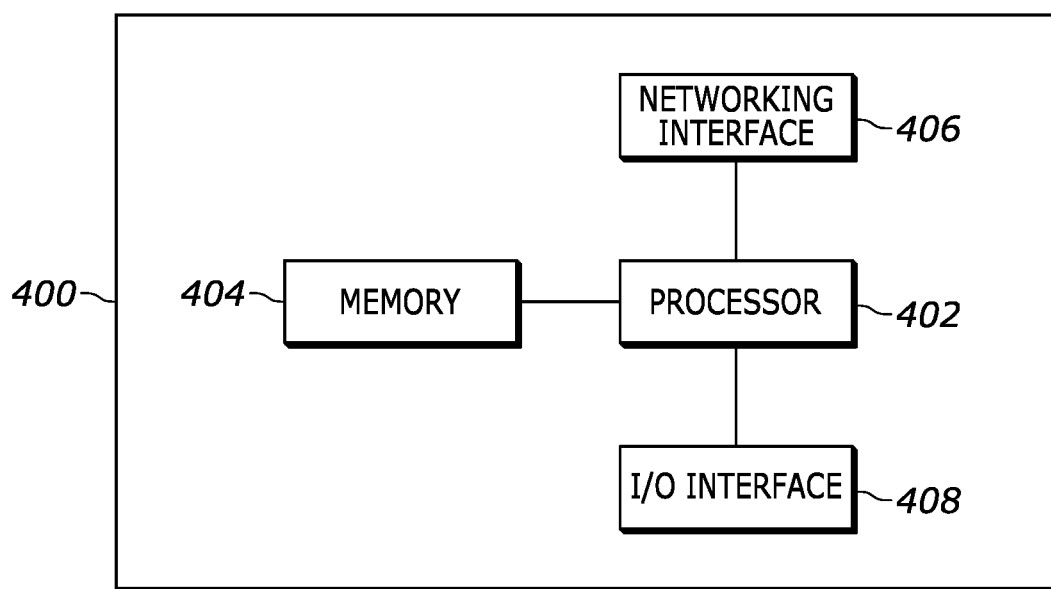
FIG. 4 is a block diagram of an example logic circuit to implement the example methods, apparatus, logic, and/or operations described herein.

In some examples, the barcode decoder 220 and the scan avoidance event detector 222 are implemented as one or more modules of machine-readable instructions executing on a processor or logic device, such as the processor 402 of the logic circuit 400 of FIG. 4. Additionally and/or alternatively, the barcode decoder 220 and/or the scan avoidance event detector 222 may be implemented by hardware, software, firmware, and/or some combination thereof.

Figure 3:
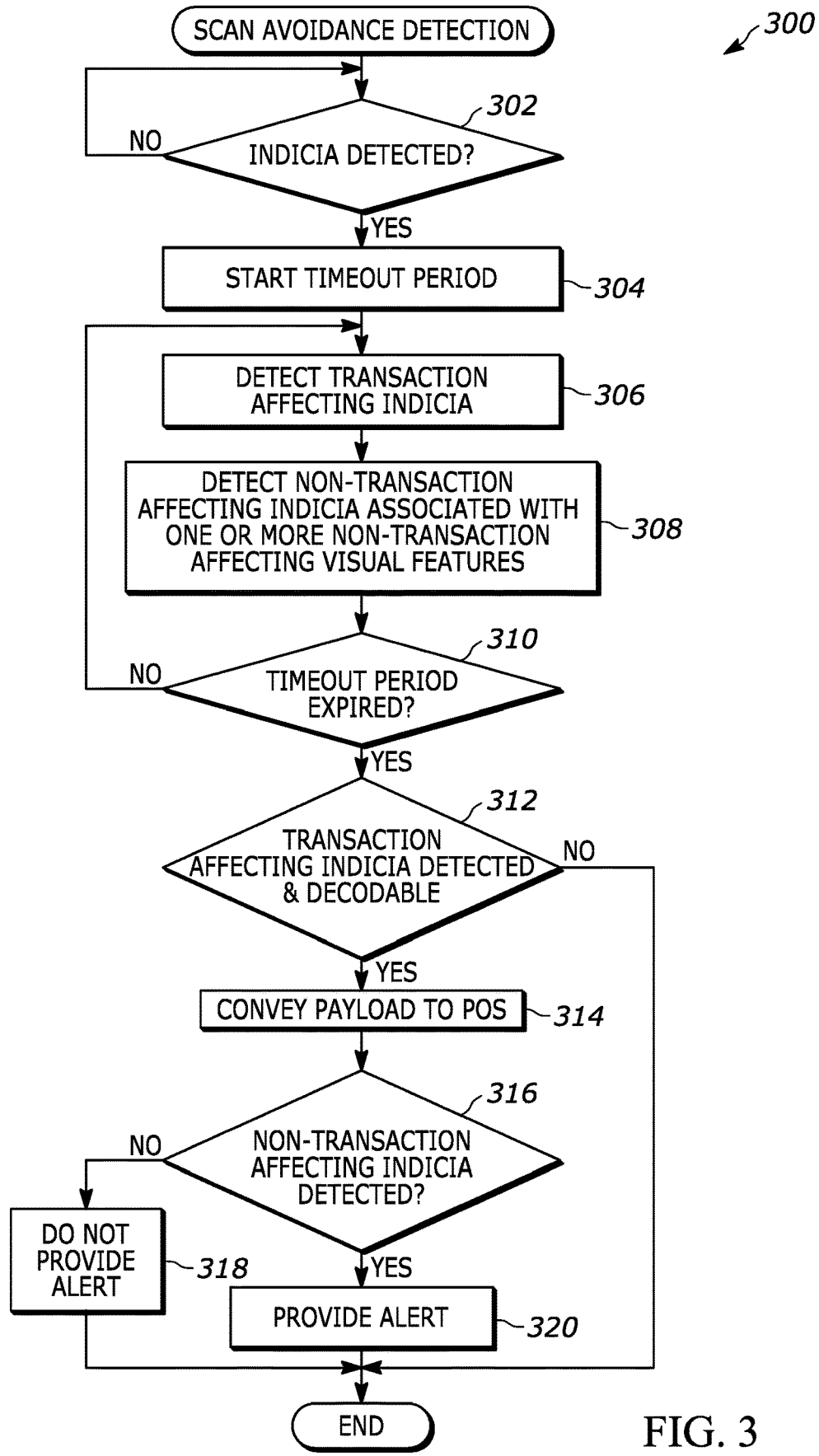
FIG. 3 is a flowchart representative of example methods, logic or machine-readable instructions for implementing the example scan avoidance event detector of FIG. 1, in accordance with aspects of this disclosure.

A flowchart 300 representative of example processes, methods, logic, software, computer- or machine-readable instructions for implementing the barcode reader 200 and the scan avoidance event detector 222 is shown in FIG. 3. In some examples, the example processes, methods, logic, software, computer- or machine-readable instructions of FIG. 3 are carried out during a decode session. The program of FIG. 3 begins at block 302 when an item 122 enters one or more FOVs of the barcode reader 200, for example, captured in one or more original images through one or more windows 206, 210 (block 302). When an indicia 124 is detected, (block 302) a timeout period is started (block 304). An example timeout period represents a time period (e.g., five hundred milliseconds) during which, it is determined whether a non-transaction affecting indicia 126 is identified and a transaction affecting indicia 124 is not identified and/or not decodable.

The barcode reader 200 attempts to detect an indicia 124 from one or more images captured through the one or more FOVs of the barcode reader 200 (block 306). The barcode reader 200 attempts to detect non-transaction affecting indicia 126 associated with non-transaction affecting visual features from one or more images captured through the one or more FOVs of the barcode reader 200 (block 308). While the timeout period has not expired (block 310), the barcode reader 200 continues attempting to detect transaction affecting indicia 124 and non-transaction affecting indicia 126 associated with non-transaction affecting visual features 126 from the one or more images. When the timeout period expires (block 310), the scan avoidance event detector 222 determines whether a transaction affecting indicia 124 was detected and decodable (block 312). If a transaction affecting indicia 124 was detected and successfully decoded (block 312), the payload of the transaction affecting indicia is conveyed to the POS system 100 (block 314). If a non-transaction affecting indicia 126 was not detected (block 316), a potential scan avoidance event is not alerted, provided, stored, etc., a scan avoidance alarm signal is not generated (block 318), and control exits from the program of FIG. 3.

Returning to block 316, if a non-transaction affecting indicia 126 associated with a non-transaction affecting visual feature was detected (block 316), a potential scan avoidance event is alerted, provided, stored, etc. and a scan avoidance alarm signal is not generated (block 320), and control exits from the program of FIG. 3.

Returning to block 312, when a transaction affecting indicia 124 was not detected (block 312), control exits from the program of FIG. 3.

FIG. 4 is a block diagram representative of an example logic circuit capable of implementing, for example, the barcode decoder 220, the scan avoidance event detector 222 and/or, more generally, the PCB 211. The logic circuit of FIG. 4 is a processing platform 400 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 400 of FIG. 4 includes an example processor 402 such as, for example, one or more microprocessors, controllers, and/or any suitable type of processor. The processing platform 400 of FIG. 4 includes memory (e.g., volatile memory, non-volatile memory) 404 accessible by the processor 402 (e.g., via a memory controller). The processor 402 interacts with the memory 404 to obtain, for example, machine-readable instructions stored in the memory 404 corresponding to, for example, the operations represented by the flowcharts and/or examples of this disclosure. Additionally or alternatively, machine-readable instructions corresponding to the example operations described herein may be stored on one or more removable media (e.g., a compact disc (CD), a digital versatile disk (DVD), removable flash memory, etc.) that may be coupled to the processing platform 400 to provide access to the machine-readable instructions stored thereon. The machine-readable instructions may be executed by the processor 402 to implement barcode decoder 220 and the scan avoidance event detector 222. The memory 404 may additionally store scan avoidance event alerts at the barcode reader 200, a remote server, etc.

The example processing platform 400 of FIG. 4 also includes a network interface 406 to enable communication with other machines via, for example, one or more networks. The network interface 406 includes any suitable type of communication interface(s) (e.g., wired and/or wireless interfaces) configured to operate in accordance with any suitable protocol(s). The network interface 406 may be used to communicatively couple the barcode reader 200 to a remote device.

The processing platform 400 of FIG. 4 also includes input/output (I/O) interfaces 408 to access image data from imaging devices, cameras, the imaging assemblies 212, 214, etc.

Although FIG. 4 depicts the I/O interfaces 408 as a single block, the I/O interfaces 408 may include a number of different types of I/O circuits or components that enable the processor 402 to communicate with peripheral I/O devices. Example interfaces 408 include an Ethernet interface, a universal serial bus (USB) interface, a Bluetooth® interface, a near field communication (NFC) interface, and/or a PCI Express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The above description refers to a block diagram of the accompanying drawings. Alternative implementations of the example represented by the block diagram include one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more DSPs, one or more ASICs, one or more FPGAs, one or more MCUs, one or more hardware accelerators, one or more special-purpose computer chips, and one or more SoC devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable storage medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A computer-implemented method for detecting a potential scan avoidance during a decode session using a symbology reader having a field-of-view (FOV), the symbology reader configured to (i) transmit payloads associated with transaction affecting barcodes to a point-of-sale (POS) system and (ii) not transmit payloads associated with non-transaction affecting barcodes to the POS system, the transaction affecting barcodes and the non-transaction affecting barcodes being different types of barcodes, the method comprising:
    during the decode session at one or more processors of the symbology reader, attempting to identify a non-transaction affecting barcode within the FOV of the symbology reader;
    during the decode session at the one or more processors of the symbology reader, attempting to decode a transaction affecting barcode within the FOV of the symbology reader; and
    responsive to identifying the non-transaction affecting barcode within the FOV of the symbology reader and further responsive to not decoding the transaction affecting barcode within the FOV of the symbology reader, determining that the potential scan avoidance attempt has occurred and generating a scan avoidance alarm signal associated with the potential scan avoidance attempt.

2. The method of claim 1, wherein the attempting to identify the non-transaction affecting barcode includes attempting to decode the non-transaction affecting barcode, and wherein the identifying the non-transaction affecting barcode within the FOV includes decoding the non-transaction affecting barcode within the FOV.

3. The method of claim 1, wherein the non-transaction affecting indica includes a quick response (QR) code.

4. The method of claim 1, wherein the transaction affecting barcodes is encoded according to a first format, and wherein the non-transaction affecting barcodes is encoded according to a second decode format different than the first decode format.

5. The method of claim 1, wherein transaction affecting barcodes is a Universal Product Code (UPC) barcode or a European Article Number (EAN) barcode.

6. The method of claim 1, further comprising at least one of conveying the scan avoidance alarm signal to a remote device for presentation to an individual distinct from a user of the symbology reader, or presenting the scan avoidance alarm signal at the POS system.

7. A system to detect a potential scan avoidance event during a decode session, the system comprising:
    a symbology reader having an imaging assembly with a field-of-view (FOV), the imaging assembly configured to capture, during the decode session, one or more images, the symbology reader configured to (i) transmit payloads associated with transaction affecting barcodes to a point-of-sale (POS) system and (ii) not transmit payloads associated with non-transaction affecting barcodes to the POS system, the transaction affecting barcodes and the non-transaction affecting barcodes being different types of barcodes, the method comprising; and
    one or more processors configured to:
        during the decode session, attempt to identify a non-transaction affecting barcode within the FOV;

during the decode session, attempt to decode a transaction affecting barcode within the FOV; and responsive to identifying the non-transaction affecting barcode within the FOV and further responsive to not decoding the transaction affecting barcode within the FOV, determine that the potential scan avoidance attempt has occurred and generate a scan avoidance alarm signal associated with the potential scan avoidance attempt.

8. The system of claim 7, wherein the one or more processors being configured to attempt to identify the non-transaction affecting barcode includes the one or more processors being configured to attempt to decode the non-transaction affecting barcode, and wherein the identifying the non-transaction affecting barcode within the FOV includes decoding the non-transaction affecting barcode within the FOV.

9. The system of claim 7, wherein the non-transaction affecting indica includes a quick response (QR) code.

10. The system of claim 7, wherein the transaction affecting barcodes is encoded according to a first format, and wherein the non-transaction affecting barcodes is encoded according to a second decode format different than the first decode format.

11. The system of claim 7, wherein transaction affecting barcodes is a Universal Product Code (UPC) barcode or a European Article Number (EAN) barcode.

12. The system of claim 7, wherein the one or more processors is further configured to cause at least one a conveying of the scan avoidance alarm signal to a remote device for presentation to an individual distinct from a user of the symbology reader, or a presenting of the scan avoidance alarm signal at the POS system.

* * * * *